US012640875B2

(12) United States Patent
Duan et al.

(10) Patent No.: US 12,640,875 B2
(45) Date of Patent: May 26, 2026

(54) CELL-SPECIFIC REFERENCE SIGNAL FOR TRACKING LOOP UPDATE

(71) Applicant: QUALCOMM Incorporated, San Diego, CA (US)

(72) Inventors: Weimin Duan, San Diego, CA (US); Huilin Xu, Temecula, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/442,391

(22) Filed: Feb. 15, 2024

(65) Prior Publication Data

US 2024/0267180 A1 Aug. 8, 2024

Related U.S. Application Data

(63) Continuation of application No. 17/524,687, filed on Nov. 11, 2021, now Pat. No. 12,212,519.

(51) Int. Cl.
| *H04L 5/00* | (2006.01) |
| *H04W 52/02* | (2009.01) |
| *H04W 68/02* | (2009.01) |

(52) U.S. Cl.
CPC ........... *H04L 5/005* (2013.01); *H04L 5/0032* (2013.01); *H04W 52/0229* (2013.01); *H04W 68/02* (2013.01)

(58) Field of Classification Search
CPC ............. H04W 68/02; H04W 52/0229; H04L 5/0032; H04L 5/005
See application file for complete search history.

(56) References Cited

U.S. PATENT DOCUMENTS

| 2015/0349940 A1 | 12/2015 | Kim et al. | |
| 2018/0316472 A1 | 11/2018 | John Wilson et al. | |
| 2019/0313411 A1* | 10/2019 | Ly ..................... | H04W 72/0453 |
| 2019/0356524 A1 | 11/2019 | Yi et al. | |
| 2019/0357264 A1 | 11/2019 | Yi et al. | |
| 2019/0386771 A1* | 12/2019 | Liu ..................... | H04B 7/0689 |
| 2020/0059874 A1* | 2/2020 | Noh ..................... | H04L 5/0051 |
| 2020/0366440 A1* | 11/2020 | Tsai ..................... | H04L 5/0051 |
| 2021/0321330 A1 | 10/2021 | Ang et al. | |
| 2022/0312334 A1 | 9/2022 | Gao et al. | |
| 2023/0144688 A1 | 5/2023 | Duan et al. | |
| 2024/0214947 A1* | 6/2024 | Park ..................... | H04L 5/0053 |

FOREIGN PATENT DOCUMENTS

WO 2020191548 10/2020

OTHER PUBLICATIONS

International Search Report and Written Opinion—PCT/US2022/077901—ISA/EPO—Jan. 19, 2023.

* cited by examiner

*Primary Examiner* — Jackie Zuniga Abad
(74) *Attorney, Agent, or Firm* — Harrity & Harrity, LLP

(57) ABSTRACT

Various aspects of the present disclosure generally relate to wireless communication. In some aspects, a New Radio (NR) user equipment (UE) may receive a configuration that configures the NR UE with a capability to use a Long Term Evolution (LTE) cell-specific reference signal (CRS) for updating a tracking loop. The NR UE may receive an LTE CRS. The NR UE may update the tracking loop based at least in part on the LTE CRS. Numerous other aspects are described.

20 Claims, 13 Drawing Sheets

1010 Receive a configuration that configures the NR UE with a capability to use a Long Term Evolution (LTE) cell-specific reference signal (CRS) for updating a tracking loop 1020 Receive an LTE CRS 1030 Update the tracking loop based at least in part on the LTE CRS

1000

1110 — Generate a configuration that configures an NR UE with a capability to use a LTE CRS for updating a tracking loop 1120 — Transmit the configuration to the NR UE

1100

CELL-SPECIFIC REFERENCE SIGNAL FOR TRACKING LOOP UPDATE

RELATED APPLICATION

This application is a continuation of U.S. patent application Ser. No. 17/524,687, filed Nov. 11, 2021, which is incorporated herein by reference in its entirety.

FIELD OF THE DISCLOSURE

This Patent Application is a continuation of U.S. Non-Provisional application Ser. No. 17/524,687 entitled "CELL-SPECIFIC REFERENCE SIGNAL FOR TRACKING LOOP UPDATE" and filed on Nov. 11, 2021. Aspects of the present disclosure generally relate to wireless communication and to techniques and apparatuses for using cell-specific reference signals for tracking loop updates.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a New Radio (NR) user equipment (UE) that is configured to operate in an NR network. The method may include receiving a configuration that configures the NR UE with a capability to use a Long Term Evolution (LTE) cell-specific reference signal (CRS) for updating a tracking loop. The method may include receiving an LTE CRS. The method may include updating the tracking loop based at least in part on the LTE CRS.

Some aspects described herein relate to a method of wireless communication performed by a base station. The method may include generating a configuration that configures an NR UE, configured to operate in an NR network, with a capability to use an LTE CRS for updating a tracking loop. The method may include transmitting the indication to the NR UE.

Some aspects described herein relate to an NR UE that is configured for wireless communication in an NR network. The NR UE may include a memory and one or more processors coupled to the memory. The one or more processors may be configured to receive a configuration that configures the NR UE with a capability to use an LTE CRS for updating a tracking loop. The one or more processors may be configured to receive an LTE CRS. The one or more processors may be configured to update the tracking loop based at least in part on the LTE CRS.

Some aspects described herein relate to a base station for wireless communication. The base station may include a memory and one or more processors coupled to the memory. The one or more processors may be configured to generate a configuration that configures an NR UE, configured to operate in an NR network, with a capability to use an LTE CRS for updating a tracking loop. The one or more processors may be configured to transmit the indication to the NR UE.

Some aspects described herein relate to a non-transitory computer-readable medium that stores a set of instructions for wireless communication by an NR UE that is configured to operate in an NR network. The set of instructions, when executed by one or more processors of the NR UE, may cause the NR UE to receive a configuration that configures the NR UE with a capability to use an LTE CRS for updating a tracking loop. The set of instructions, when executed by one or more processors of the NR UE, may cause the NR UE to receive an LTE CRS. The set of instructions, when executed by one or more processors of the NR UE, may cause the NR UE to update the tracking loop based at least in part on the LTE CRS.

Some aspects described herein relate to a non-transitory computer-readable medium that stores a set of instructions for wireless communication by a base station. The set of instructions, when executed by one or more processors of the base station, may cause the base station to generate a configuration that configures an NR UE, configured to operate in an NR network, with a capability to use an LTE CRS for updating a tracking loop. The set of instructions, when executed by one or more processors of the base station, may cause the base station to transmit the indication to the NR UE.

Some aspects described herein relate to an apparatus configured for wireless communication in an NR network. The apparatus may include means for receiving a configuration that configures the apparatus with a capability to use an LTE CRS for updating a tracking loop. The apparatus may include means for receiving an LTE CRS. The apparatus may include means for updating the tracking loop based at least in part on the LTE CRS.

Some aspects described herein relate to an apparatus for wireless communication. The apparatus may include means for generating a configuration that configures an NR UE, configured to operate in an NR network, with a capability to use an LTE CRS for updating a tracking loop. The apparatus may include means for transmitting the indication to the NR UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
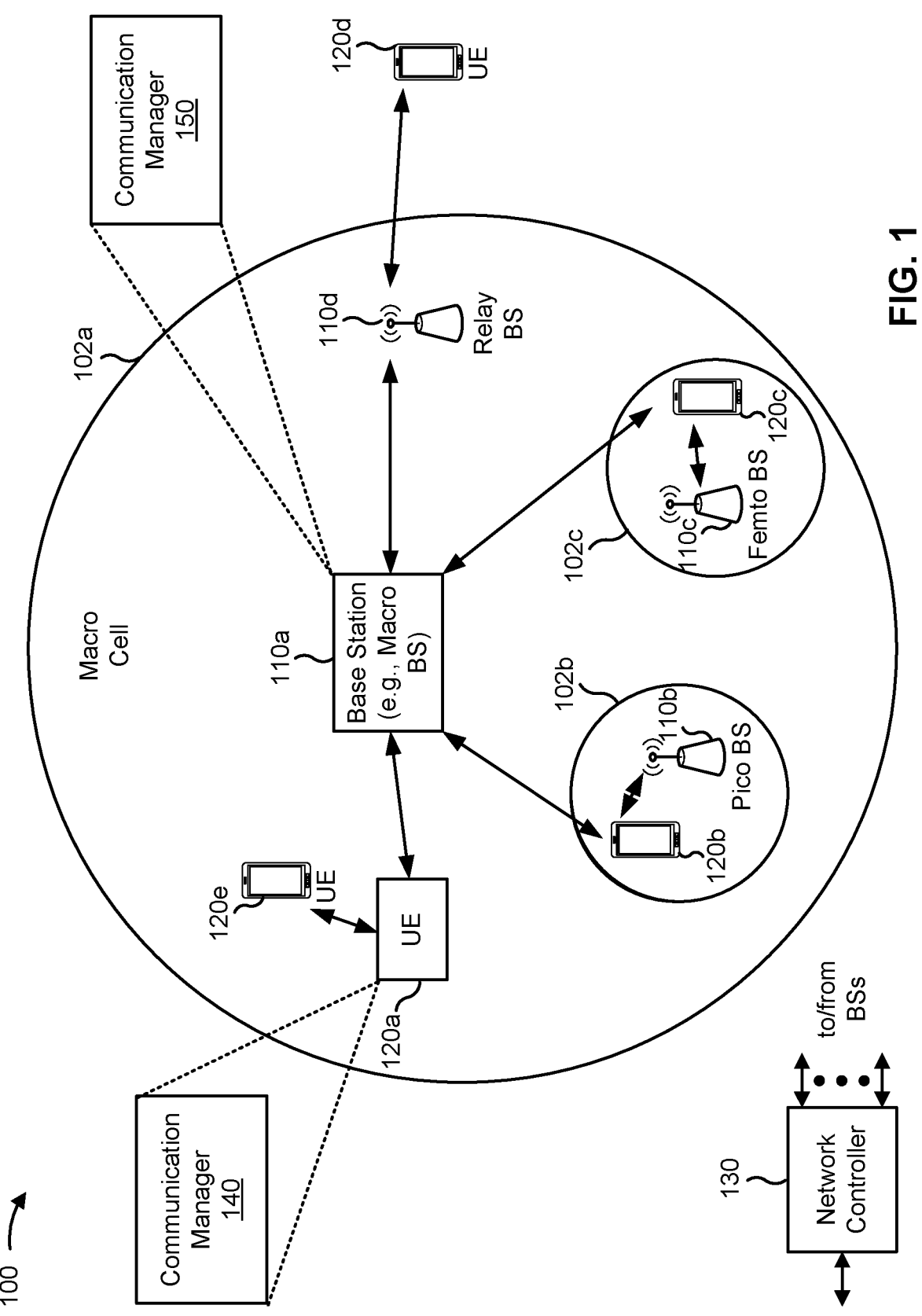
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120c), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V21) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4*a* or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-*a* or FR4-1, and/or FR5, or may be within the EHF band. It is contemplated that the frequencies included in these operating bands (e.g., FR1, FR2, FR3, FR4, FR4-*a*, FR4-1, and/or FR5) may be modified, and techniques described herein are applicable to those modified frequency ranges.

In some aspects, an NR UE (e.g., a UE 120 configured to operate in an NR network) may include a communication manager 140. As described in more detail elsewhere herein, the communication manager 140 may receive a configuration that configures the NR UE with a capability to use an LTE cell-specific reference signal (CRS) for updating a tracking loop. An LTE CRS is a downlink reference signal that can be used for cell search and initial acquisition, automatic gain control (AGC), downlink channel quality measurements, and/or downlink channel estimation for coherent demodulation and detection at the NR UE. A tracking loop is used to track an LTE frame timing, AGC, and time of arrival changes. The communication manager 140 may receive an LTE CRS and update the tracking loop based at least in part on the LTE CRS. Additionally, or alternatively, the communication manager 140 may perform one or more other operations described herein.

In some aspects, the base station 110 may include a communication manager 150. As described in more detail elsewhere herein, the communication manager 150 may generate a configuration that configures an NR UE with a capability to use an LTE CRS for updating a tracking loop. The communication manager 150 may transmit the indication to the NR UE. Additionally, or alternatively, the communication manager 150 may perform one or more other operations described herein.

As indicated above, FIG. 1 is provided as an example. Other examples may differ from what is described with regard to FIG. 1.

Figure 2:
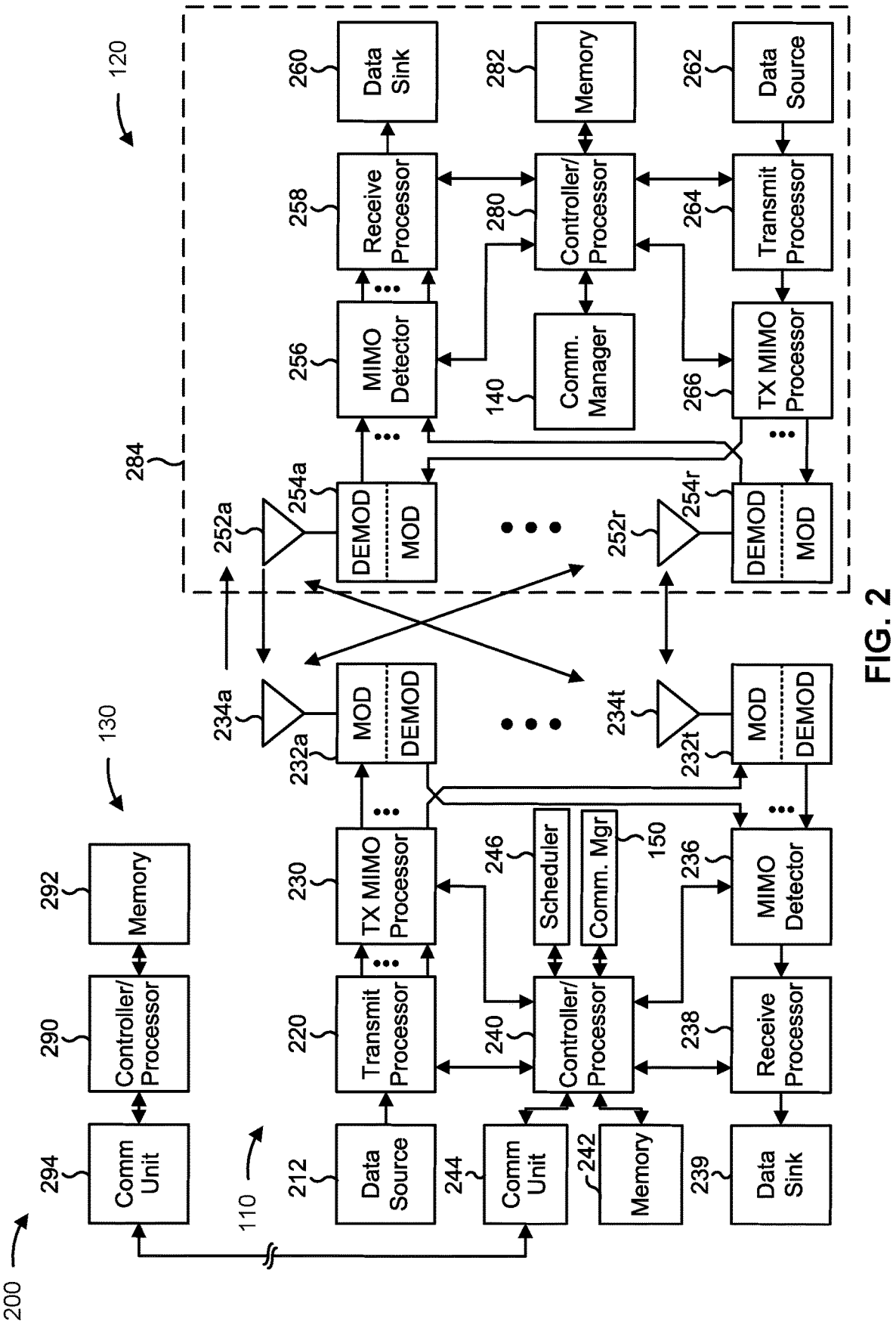
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a CRS or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the base station 110, the controller/processor 280 of the UE 120, and/or any other component(s) of FIG. 2 may perform one or more techniques associated with using an LTE CRS to update a tracking loop, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120, configured to operate in an NR network, includes means for receiving a configuration that configures the UE 120 with a capability to use an LTE CRS for updating a tracking loop; means for receiving an LTE CRS; and/or means for updating the tracking loop based at least in part on the LTE CRS. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for generating a configuration that configures an NR UE with a capability to use an LTE CRS for updating a tracking loop; and/or means for transmitting the indication to the NR UE. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
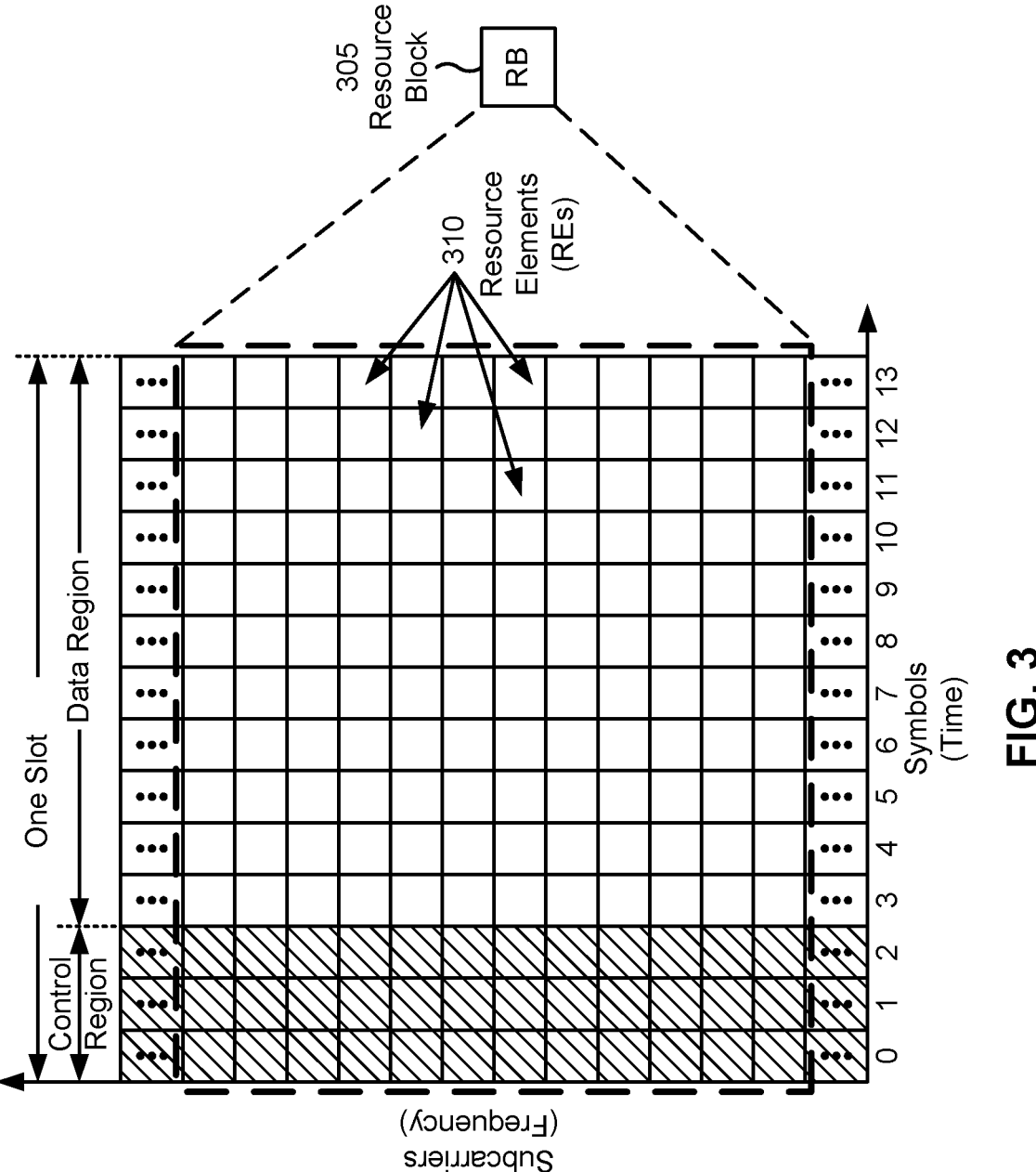
FIG. 3 is a diagram illustrating an example of a slot format, in accordance with the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured. Control channels may be in some symbols of the control region. Reference signals may be transmitted in other symbols.

As indicated above, FIG. 3 is provided as an example. Other examples may differ from what is described with respect to FIG. 3.

Figure 4:
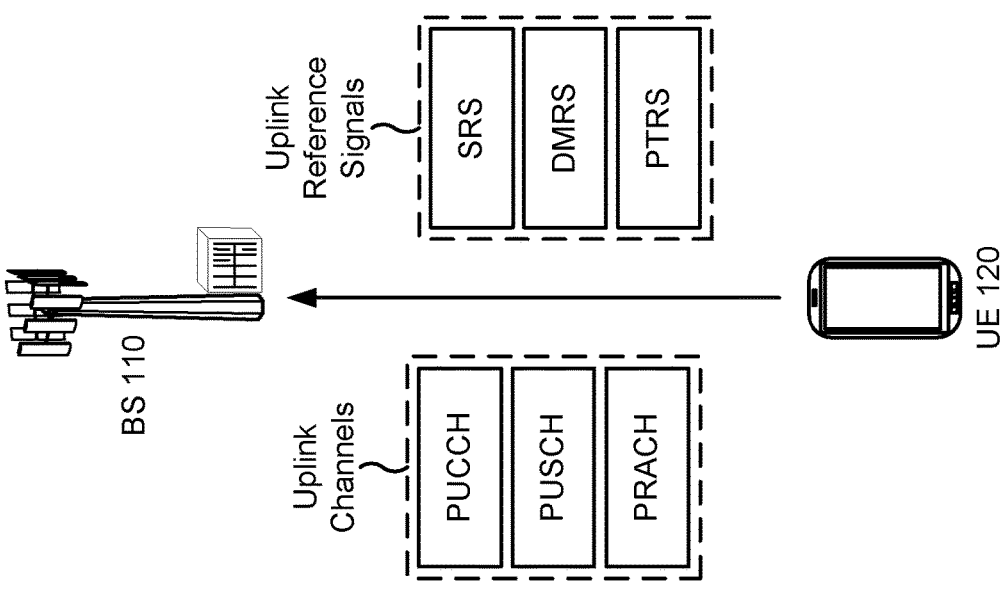
FIG. 4 is a diagram illustrating an example of physical channels and reference signals in a wireless network, in accordance with the present disclosure.
Figure 4:
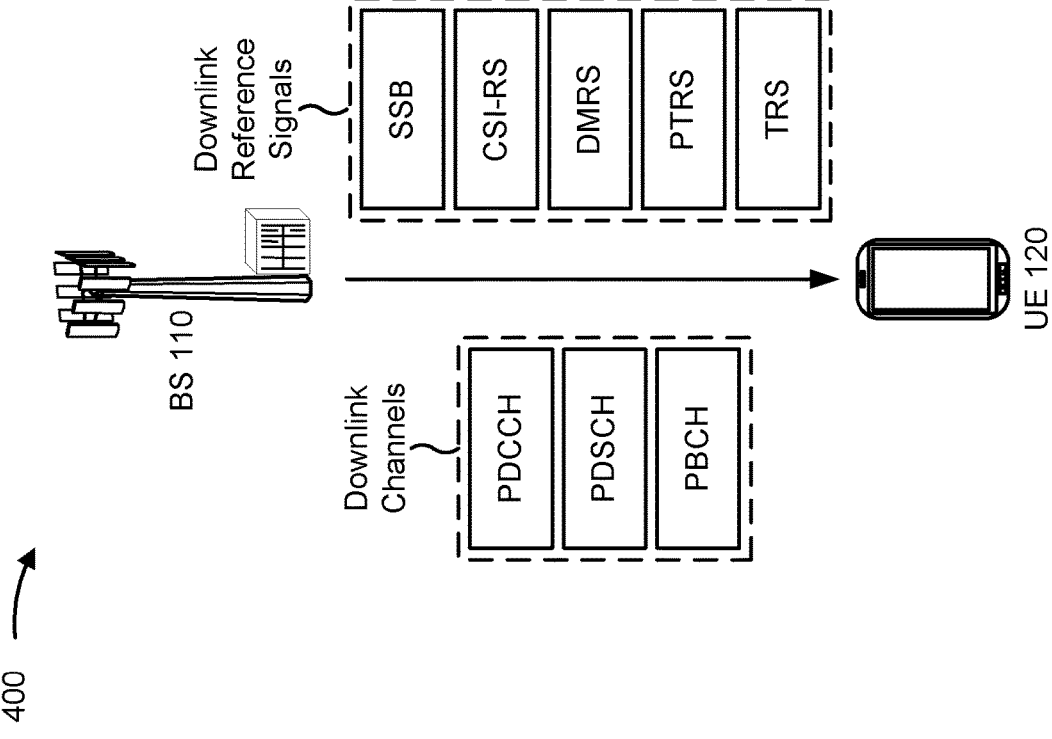

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE).

As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

Base stations in some cells may form a first MBS single frequency network (MBSFN) area, and base stations in other cells may form a second MBSFN area. Different MBSFN areas may have different carrier frequencies. If two nearby or adjacent MBSFN areas have the same carrier frequency, the MBSFN subframes or radio frames for the cells in the two MBSFN areas may be time division multiplexed. The time division multiplexing of subframes or radio frames for MBSFN transmissions may help to avoid interference between different MBSFN areas. Each base station in an MBSFN area may synchronously transmit the same control information and/or data (e.g., for an MBSFN service provided thereby).

Each MBSFN area may support broadcast, multicast, and unicast services. A unicast service is a service intended for a specific UE, such as a voice call. A multicast service is a service that may be received by a group of UEs within an MBSFN area, such as a subscription video service. A broadcast service is a service that may be received by all UEs within an MBSFN area, such as a news broadcast. The first MBSFN area may support a first multicast service or a first broadcast service (for example, an evolved multicast service or an evolved broadcast service). The second MBSFN area may support a second multicast/broadcast service, such as by providing a different news broadcast to the UE.

Base stations may communicate using MBSFN subframes. The MBSFN subframes may include multicast control channels (MCCHs) and multicast traffic channels (MTCHs). In MBSFN subframes, symbols may be reserved for PDCCH (such as a non-MBSFN PDCCH). For example, the first one or two symbols of a given MBSFN subframe may be for PDCCH. The MBSFN subframes may also include MBSFN reference signals (MBSFN RS). The MBSFN RS may be denser than cell-specific reference signals. An MBSFN RS may be on antenna port 4, and a cell-specific reference signal may be on antenna ports 0-3. The MBSFN RS may be defined for wideband and extended cyclic prefix (ECP), and may not be defined for non-wideband or normal cyclic prefix (NCP) communications.

A tracking reference signal (TRS) is a downlink signal that may be used to perform time synchronization or frequency synchronization with an MBSFN area, or to perform other tracking in order to receive communications in the MBSFN area. For example, a UE may use the TRS to update a tracking loop, which tracks changes to a frame timing of the network and an estimated time of arrival (TOA) of signals to be received by the UE. The UE may use the tracking loop updated by TRSs to perform operations quickly when transitioning from an idle or inactive state to a connected state.

The base station may utilize the TRS to estimate the channel parameters for communication with the UE. The base station may transmit a radio resource control (RRC) message to a connected UE (e.g., a UE operating in an RRC state of RRC_CONNECTED). The RRC message may include configuration information for the TRS, or a TRS configuration. The UE may receive the RRC message and may store the TRS configuration. The UE may perform an action causing phase discontinuity, such as bandwidth part (BWP) switching, BWP activation, carrier aggregation, cell activation (e.g., secondary cell activation), multi-TRP switching, multi-panel switching, or beam changing, where the UE uses the TRS for fast synchronization and fine time/frequency tracking.

The UE may be configured to operate in one of at least three RRC states. For example, a UE may operate in an RRC_CONNECTED mode where the UE is connected to the wireless network (e.g., in both the control and user planes) through the base station. That is, a UE in an RRC_CONNECTED mode may have an access stratum (AS) context stored in the RAN, the UE may belong to a specific cell, the UE may communicate unicast data, and the RAN may control mobility of the UE. In an RRC_INACTIVE mode, the UE may have an RRC context established with the base station or a core network connection established, but no data transfer is possible from the UE. The UE may still be able to receive paging initiated by the RAN and receive a broadcast of system information. In an RRC_IDLE mode, where RRC context and base station or core network connections are not established, no data transfer is possible from the UE. The UE may still be able to receive a broadcast of system information.

A base station may transmit a TRS to the UE when the UE is in an idle or inactive state. The TRS configuration information received by the UE in the RRC message may indicate the resources on which the base station may transmit the TRS. In NR, there is no CRS. The TRS may be specifically configured for the UE for time/frequency tracking. For example, the TRS may be configured as a CSI-RS resource set with single-port non-zero power (NZP) CSI-RS. The TRS may be periodic, semi-persistent, or aperiodic. Where the TRS is periodic, the TRS configuration information may identify the resources where the TRS will be periodically transmitted. Where the TRS is semi-persistent, the TRS may be activated and deactivated by a medium access control control element (MAC-CE) and the TRS configuration information may identify the resources where the TRS will be transmitted when the TRS is activated, or may identify a resource position relative to the resources carrying the MAC-CE where the TRS will be transmitted. Where the TRS is aperiodic, the TRS may be triggered by the DCI for an uplink grant. The triggering uplink grant may indicate one of a set of slot offset values, and the TRS configuration information may identify a set of slot offset values, where the slot offset is the number of slots between the slot transmitting the TRS and the slot carrying the uplink DCI.

The UE may receive the TRS and may compare the resources on which the TRS is received to the expected resources to perform time and frequency synchronization and tracking.

In some scenarios, broadcast/multicast transmissions may occupy or have different multicast areas, and may employ different SFN cell IDs, BWPs, quasi-co-location (QCL) beams and/or different uplink/downlink beams. The TRS may be employed in multicast systems to provide IDLE/ INACTIVE UEs with BWP switching and/or activation. Some TRSs, such as a persistent TRS and/or a semi-persistent TRS, may be configured by system information blocks (SIBs) and/or MCCH communications, and a semi-persistent TRS may be activated by MAC-CE. A large periodicity may be used to reduce the overhead, which may be a multiple of the MCCH periodicity.

The TRS may include information that is associated with receiving the broadcast/multicast service that is based on an RRC state of the UE. For example, the information associated with the broadcast/multicast service may include a BWP on which the broadcast/multicast service is to be received by the UE when the UE is operating in an idle or inactive state. The information may include a BWP and/or a serving cell on which the broadcast/multicast service is to be received by the UE when the UE is operating in a connected state. The BWP and/or the serving cell may be configured to provide continuity of the broadcast/multicast service to be received by the UE when the UE is operating in the connected state. The base station may transmit the TRS in a multicast transmission to UEs that are in a connected state and moving, for BWP switching and/or cell switching or activation to maintain service continuity.

The TRS may be an aperiodic TRS that is triggered by a group downlink DCI for a BWP. A multicast data transmission may also be employed for faster tracking by the UE. An aperiodic TRS can be used for the MCCH, where a group downlink DCI with an MCCH radio network temporary identifier (RNTI) is employed. An aperiodic TRS can also be used for the MTCH, where a group downlink DCI with group RNTI (G-RNTI) may be employed for the MTCH with a higher MCS. The base station may also transmit an aperiodic TRS before an instantaneous multicast data transmission. The downlink DCI may indicate the TRS slot offset (including a zero offset) relative to the slot carrying the DCI.

The base station may transmit downlink DCI with a cell RNTI (C-RNTI) to trigger an aperiodic TRS at a target base station before the multicast transmission. The source base station may also be the base station transmitting multicast transmissions, and/or the source base station may be the serving cell for unicast retransmissions.

As indicated above, FIG. 4 is provided as an example. Other examples may differ from what is described with regard to FIG. 4.

Figure 5:
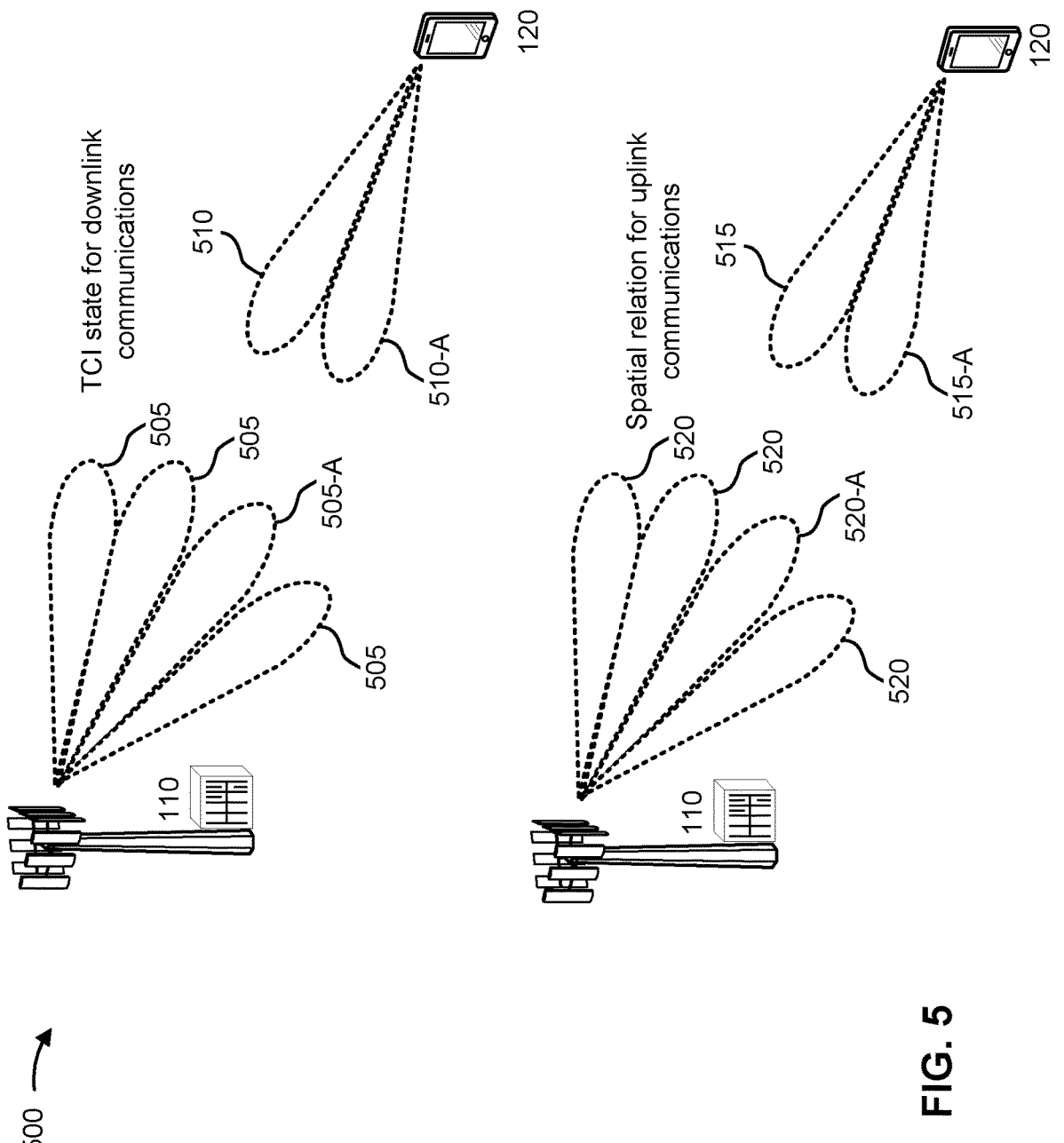
FIG. 5 is a diagram illustrating an example of using beams for communications between a base station and a UE, in accordance with the present disclosure.

FIG. 5 is a diagram illustrating an example 500 of using beams for communications between a base station and a UE, in accordance with the present disclosure. As shown in FIG. 5, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 505.

The UE 120 may attempt to receive downlink transmissions via one or more UE receive beams 510, which may be configured using different beamforming parameters at receive circuitry of the UE 120. The UE 120 may identify a particular BS transmit beam 505, shown as BS transmit beam 505-A, and a particular UE receive beam 510, shown as UE receive beam 510-A, that provide relatively favorable performance (for example, that have a best channel quality of the different measured combinations of BS transmit beams 505 and UE receive beams 510). In some examples, the UE 120 may transmit an indication of which BS transmit beam 505 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 505-A and the UE receive beam 510-A), which may be further refined and maintained in accordance with one or more established beam refinement procedures.

A downlink beam, such as a BS transmit beam 505 or a UE receive beam 510, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 505 may be associated with a synchronization signal block (SSB), and the UE 120 may indicate a preferred BS transmit beam 505 by transmitting uplink transmissions in resources of the SSB that are associated with the preferred BS transmit beam 505. A particular SSB may have an associated TCI state (for example, for an antenna port or for beamforming). The base station 110 may, in some examples, indicate a downlink BS transmit beam 505 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). QCL Type A may involve a Doppler shift, a Doppler spread (widening of the spectrum of a narrow-band signal due to Doppler shift frequencies of different paths), an average delay of a signal traveling through the different paths, and a delay spread (variation of the delays through the different paths). QCL Type B may involve a Doppler shift and a Doppler spread. QCL Type C may involve an average delay and a Doppler shift. QCL Type D may involve spatial relation parameters at the UE. In cases where the QCL type indicates spatial receive parameters, the QCL type may correspond to analog receive beamforming parameters of a UE receive beam 510 at the UE 120. Thus, the UE 120 may select a corresponding UE receive beam 510 from a set of BPLs based at least in part on the base station 110 indicating a BS transmit beam 505 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 515.

The base station 110 may receive uplink transmissions via one or more BS receive beams 520. The base station 110 may identify a particular UE transmit beam 515, shown as UE transmit beam 515-A, and a particular BS receive beam 520, shown as BS receive beam 520-A, that provide relatively favorable performance (for example, that have a best channel quality of the different measured combinations of UE transmit beams 515 and BS receive beams 520). In some examples, the base station 110 may transmit an indication of which UE transmit beam 515 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 515-A and the BS receive beam 520-A), which may be further refined and maintained in accordance with one or more established beam refinement procedures. An uplink beam, such as a UE transmit beam 515 or a BS receive beam 520, may be associated with a spatial relation. A spatial relation may indicate a directionality or a characteristic of the uplink beam, similar to one or more QCL properties, as described above.

As indicated above, FIG. 5 is provided as an example. Other examples may differ from what is described with respect to FIG. 5.

Figure 6:
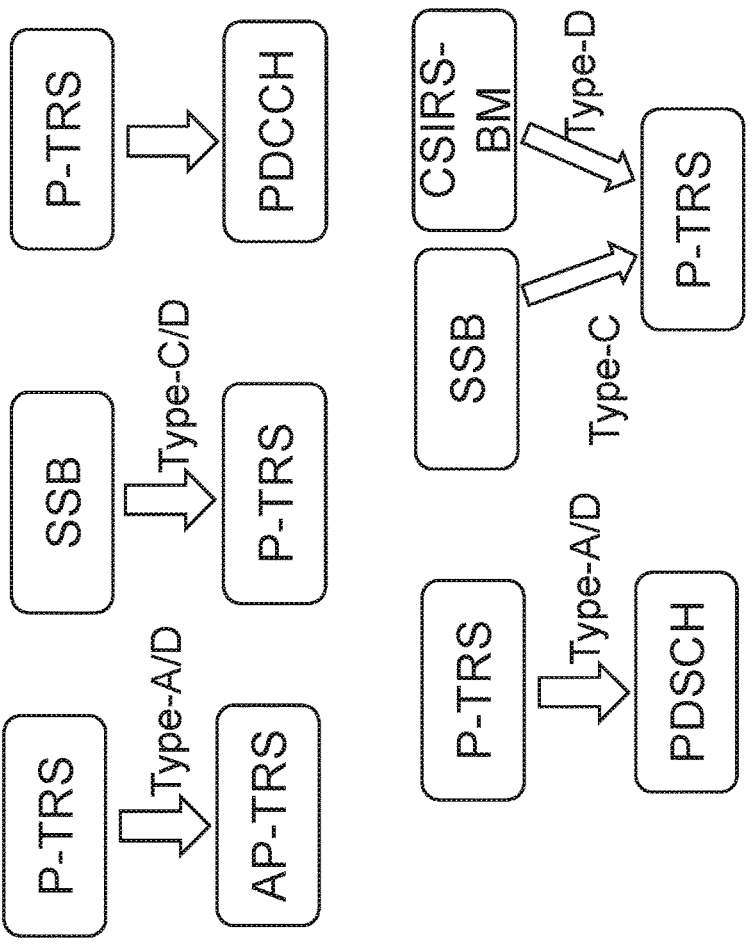
FIG. 6 is a diagram illustrating an example of quasi-co-location relationships, in accordance with the present disclosure.

FIG. 6 is a diagram illustrating an example 600 of QCL relationships, in accordance with the present disclosure.

Reference signals and control channels may have QCL relationships of different types. For example, a PTRS may have a QCL Type A or a QCL Type D relationship with an aperiodic TRS. An SSB may have a QCL Type C or a QCL Type D relationship with a PTRS. A PTRS may have a QCL relationship with a PDCCH. A PTRS may have a QCL Type A or a QCL Type D relationship with a PDSCH. An SSB may have a QCL Type C relationship with a PTRS, which has a QCL Type D relationship with a CSI-RS for beam management (BM).

As indicated above, FIG. 6 is provided as an example. Other examples may differ from what is described with regard to FIG. 6.

Figure 7:
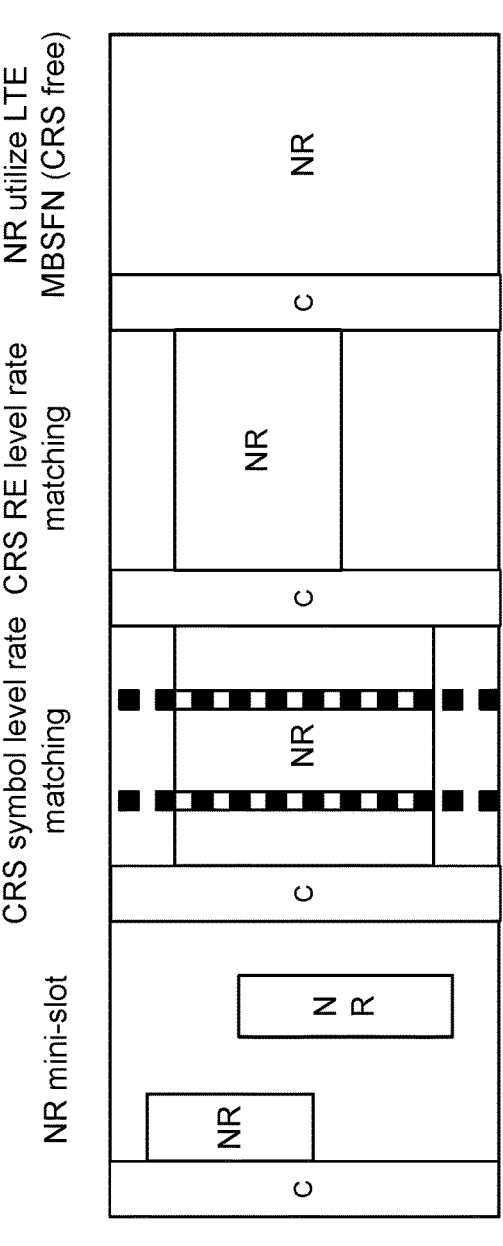
FIG. 7 is a diagram illustrating an example of dynamic spectrum sharing (DSS), in accordance with the present disclosure.

FIG. 7 is a diagram illustrating an example 700 of dynamic spectrum sharing (DSS), in accordance with the present disclosure.

As NR is deployed, some solutions for NR involve coexistence with LTE. DSS provides a migration path from LTE to NR by allowing LTE and NR to share the same carrier. There may be different DSS solutions for LTE and NR co-channel existence. Example 700 shows some downlink DSS solutions. For example, NR may use mini-slots, including for NR PDCCH, that avoid the LTE PDCCH (e.g., first 3 symbols labeled "C" for control). NR may use rate matching (where bits are repeated or punctured) at a CRS symbol level or a CRS RE level. NR PDSCH DMRSs may be transmitted in an LTE normal subframe (e.g., an additional DMRS avoids CRS). The NR general rate matching may be around an LTE PBCH, and an LTE NR may also utilize an LTE MBSFN without CRSs. For uplink DSS solutions, uplink subcarriers may be aligned. For example, a radio resource control (RRC) message may configure whether to apply 7.5 kHz shifting. Cross-carrier scheduling solutions may include a secondary cell (SCell) in a non-DSS carrier that schedules the PDSCH or the PUSCH of a secondary primary cell (SpCell) in a DSS carrier. Reduced capacity UEs with less power and complexity may be in a DSS cell.

A TRS can be configured for idle/inactive mode UEs for tracking loop updates. If the TRS has been configured to some connected mode UE with no dedicated idle/inactive TRS, there may be no extra network consumption. A UE may save power with an increased density of opportunities for tracking loop updates, including with both SSBs and TRSs. For example, if a TRS with 20 ms periodicity is configured, on average, the joint SSB/TRS periodicity is 10 ms. Currently, system information block (SIB) signaling provides the configuration of TRS/CSI-RS occasions and only periodic TRS is supported. Layer 1 (L1) signaling may indicate whether a TRS is transmitted in the configured occasions. Before the UE receives the indication, the UE may expect that a TRS is not transmitted (no blind detection is required). The TRS may be QCLed with a transmitted SSB. The subcarrier spacing (SCS) of the TRS may be the same as the SCS of control resource set zero (CORESET0). The UE is not expected to receive the TRS outside of the initial downlink bandwidth part (BWP).

As indicated above, FIG. 7 is provided as an example. Other examples may differ from what is described with regard to FIG. 7.

Figure 8:
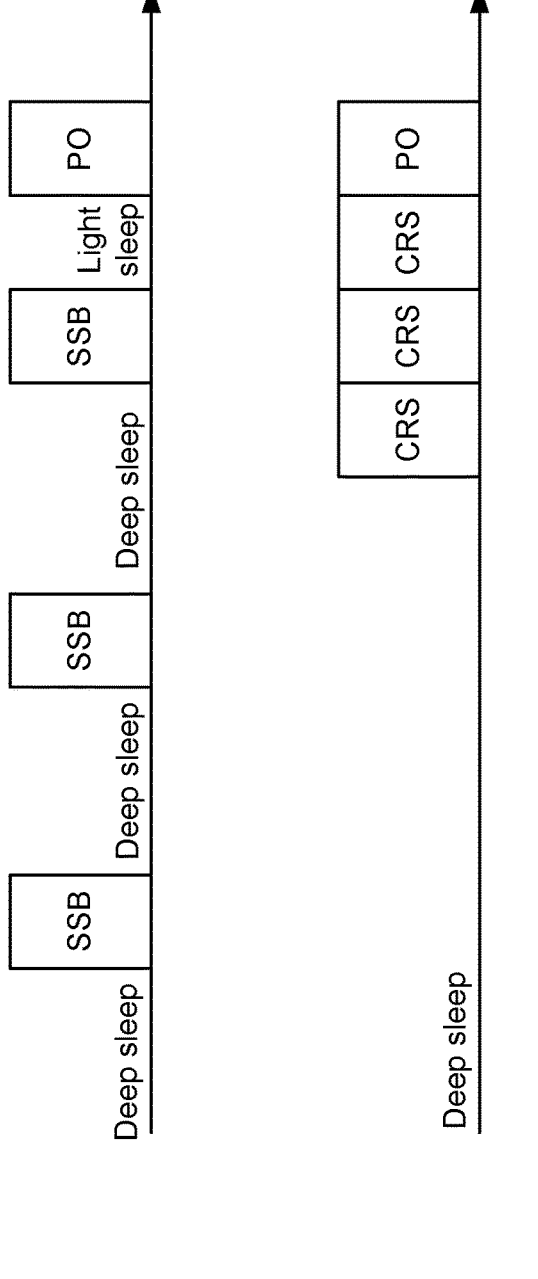
FIG. 8 is a diagram illustrating an example of Long Term Evolution (LTE) cell-specific reference signals (CRSs), in accordance with the present disclosure.

FIG. 8 is a diagram illustrating an example 800 of LTE CRSs, in accordance with the present disclosure.

LTE has always-on CRSs that are accessible to both connected mode and idle mode UEs. An idle mode UE may use a CRS for channel estimation, downlink synchronization, and/or radio resource management (RRM) measurements. In comparison to LTE, NR has fewer resources for UE idle/inactive mode operation, and NR idle/inactive mode UE uses an SSB or a TRS. The SSB is transmitted in limited bandwidth with only 20 RBs and with sparse periodicity (e.g., 20 ms). Other reference signals, such as CSI-RS and PTRS are only available to connected mode UEs based on a UE specific configuration. Because of this, NR idle/ inactive mode operation has less flexibility and worse performance than LTE, in addition to larger power consumption.

The NR network does not use a CRS. Example 800 shows that an NR UE may wake up multiple times to receive multiple SSBs for tracking a loop update in a low signal to noise ratio (SNR) condition, while the LTE UE only needs to wake up once to use CRS to update tracking loops and process a paging occasion (PO).

As indicated above, FIG. 8 is provided as an example. Other examples may differ from what is described with regard to FIG. 8.

Figure 9:
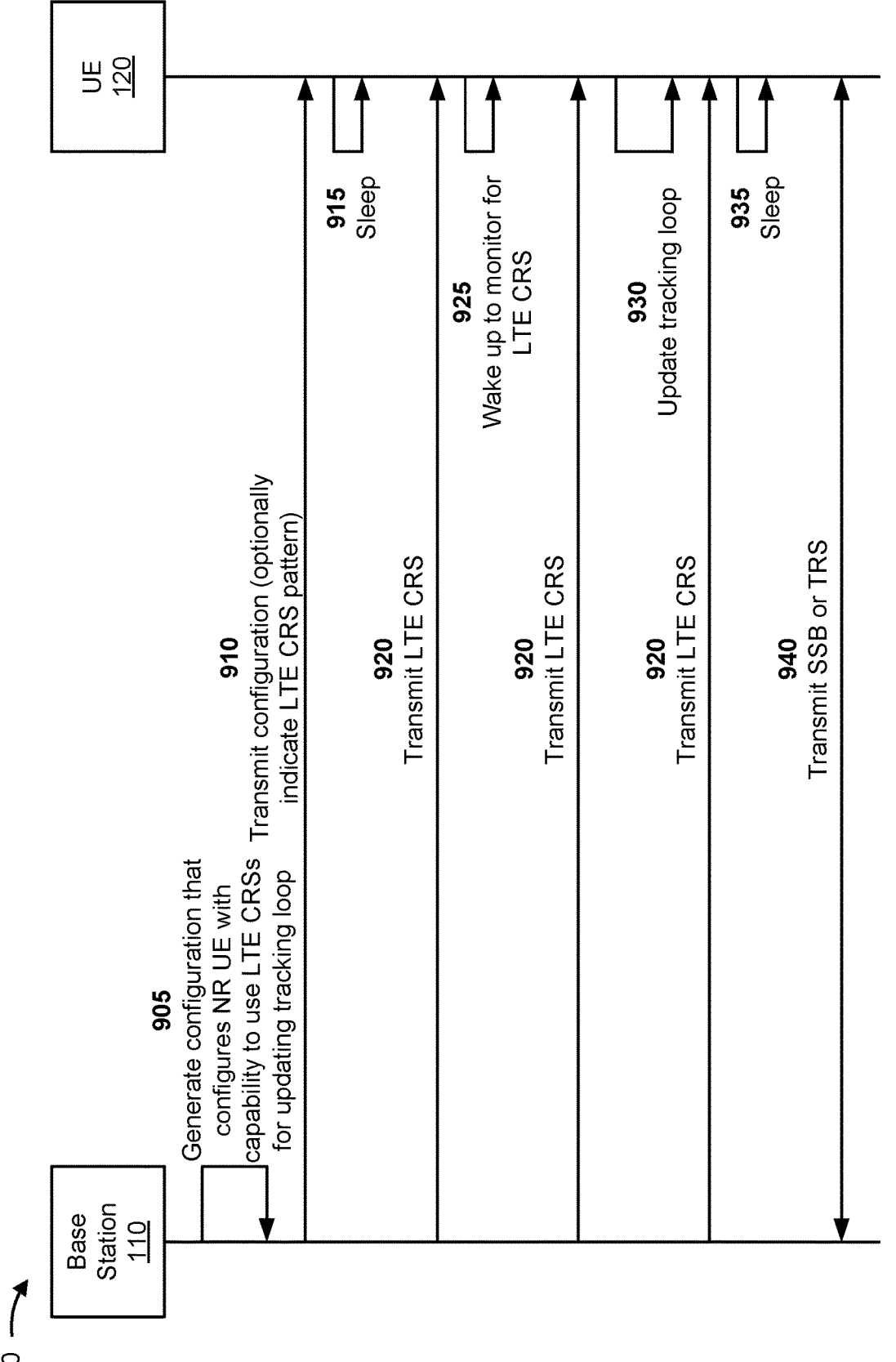
FIG. 9 is a diagram illustrating an example associated with using LTE CRSs for tracking loop updates, in accordance with the present disclosure.

FIG. 9 is a diagram illustrating an example 900 associated with an NR UE using LTE CRSs for tracking loop updates, in accordance with the present disclosure. As shown in FIG. 9, a base station 110 and a UE 120 may communicate with one another. UE 120 may be an NR UE, which is a UE that is configured to operate in an NR network, such as network 100 described in connection with FIGS. 1 and 2. The base station 110 may represent functionality of an LTE eNB and/or an NR gNB. UE 120 may also operate in an LTE network on a DSS carrier that is shared with the NR network.

The NR network may expect to use an NR reference signal for an NR UE in connected mode and thus the network may not expect to be able to transmit the NR reference signal to an idle/inactive UE at any time. Furthermore, the NR reference signal for the connected mode UE is normally transmitted within one SSB beam and thus the coverage of the NR reference signal is limited. If an additional reference signal were available (e.g., TRS, CSI-RS) for the NR idle/inactive mode UE, the NR UE could save more power. Accordingly, a TRS may be used for downlink tracking and synchronization (time, frequency, and gain). A system information block (SIB) or L1 signaling may be used to transmit the TRS in an NR idle/inactive mode.

In DSS scenarios, an eNB for LTE and a gNB for NR may be co-located and use the same antennas in DSS bands. An LTE CRS signal may have similar channel properties as the TRS in NR. Since CRS processing is similar to NR TRS/CSI-RS processing, an NR UE may use an LTE CRS from a co-located eNB (and the same antennas) for a tracking loop update, a pathloss measurement, and/or an RRM measurement of NR. The NR network may reuse the TRS engine for CSI-RS processing with minor changes. That is, both the NR UE and the NR network may conserve signaling resources by using an LTE CRS for tracking loop updates.

According to various aspects described herein, a UE operating in NR may use an LTE CRS to update a tracking loop in addition to an idle/inactive mode NR reference signal. For example, in DSS scenarios, the NR UE may measure the LTE CRS or obtain timing information based at least in part on the LTE CRS. By using the LTE CRS, the UE operating in NR may save power and quickly activate a secondary cell (SCell). While some NR reference signals, such as a TRS with a minimum periodicity of 10 ms, may be used for power saving, an LTE CRS is transmitted at least in two symbols in each ms and thus has a higher density or frequency than the TRS or other NR reference signals. This allows the idle/inactive mode UE to converge its tracking loops within a few ms (e.g., at most 3 ms), even with a very low signal to noise ratio (SNR). In other words, an NR UE may wake up when necessary and still save power due to the increased density of opportunities for tracking loop updates provided by the always-on LTE CRS.

The NR UE may, for a DSS session, use an aperiodic TRS transmitted by the gNB in a deactivated SCell to help the NR UE update tracking loops. In this way, the NR UE can immediately activate a SCell without first processing the next SSB. If the SCell is in a DSS band, the NR UE may use an LTE CRS for fast SCell activation, instead of using the aperiodic TRS.

Example 900 shows an NR UE that uses an LTE CRS for updating a tracking loop. As shown by reference number 905, the base station 110 (e.g., gNB) may generate a configuration that configures an NR UE (e.g., UE 120) with a capability to use LTE CRSs for updating the tracking loop of the UE 120. As shown by reference number 910, the base station 110 may transmit the indication.

For the LTE CRS, the UE 120 may use a QCL relationship (e.g., shared TCI state) between the LTE CRS and an NR SSB/TRS on a DSS carrier. For example, the NR TRS/SSB may be QCLed-Type C or QCLed-Type D with an LTE CRS from a serving or neighboring TRP. A paging PDCCH and a paging PDSCH for NR are transmitted in each SSB beam. If an SSB is QCLed with a LTE CRS, the UE 120 may measure the LTE CRS for paging reception in the SSB beam. This may include a time and frequency tracking loop and an automatic gain control (AGC) update for the SSB beam. In general, the tracking loops and the AGC may be updated based at least in part on hybrid signaling involving the NR TRS/SSB and/or the LTE CRS. Alternatively, in some aspects, for a CSI RS, the LTE CRS may be QCLed with a set of SSBs such that the whole bandwidth for SSBs is not needed.

In some aspects, depending on the QCL relationship between the LTE CRS and the NR SSB/TRS on DSS carrier, the base station 110 may indicate the LTE CRS pattern (e.g., periodicity, timing) to the UE 120, to facilitate additional intra-frequency and inter-frequency measurements by the NR UE in all RRC states (idle/inactive/connected) or a subset of the RRC states. The base station 110 may indicate the LTE CRS pattern, a resource ID, and/or a transmit power offset through an SIB or dedicated RRC signaling. In some aspects, the LTE CRS pattern (configuration), a resource ID, a transmit power offset may be included in a PTRS configuration, including for the idle/inactive mode. A QCL configuration associated with the LTE CRS may be added in TCI state information.

In order to update an AGC and to use LTE CRS for NR RRM measurements for mobility, the base station 110 may configure a transmit power offset between the LTE CRS and a secondary synchronization signal (SSS) or a paging physical downlink channel (PDCCH or PDSCH). The LTE CRS pattern configured by the base station 110 for the UE 120 can be a subset of the CRSs actually transmitted by an eNB, which are QCLed with the NR SSB/TRS. For power saving and simplicity of rate matching, the UE 120 may not need to measure CRSs in every subframe. In some aspects, the NR TRS/SSB may not be mapped to any symbol that contains a CRS. In a slot in which CRS is transmitted on some symbols, the TRS can be transmitted on other symbols. The UE 120 may expect that the TRS is not mapped on symbols occupied by CRS transmissions of a neighbor TRP.

In an MBFSN deployment, the CRS may only be transmitted in the first symbol, which may be not enough for a tracking loop update. In this case, the UE 120 only measures the TRS for tracking loop update in an MBSFN subframe. In some aspects, the UE 120 may still use the CRS for other purposes, such as a TTL/AGC update or for RRM.

As shown by reference number 915, the UE 120 may go to sleep (enter idle/inactive mode). As shown by reference number 920, the base station 110 may transmit LTE CRSs according to the LTE CRS pattern. The UE 120 may not be awake for each LTE CRS. However, if the UE 120 wakes up to monitor for an LTE CRS, as shown by reference number 925, the UE 120 may update a tracking loop based at least in part on the LTE CRS, as shown by reference number 930. The UE 120 may be paged to wake up. The tracking loop may be updated to keep a synchronization with the NR network accurate for decoding received messages. The UE 120 may also receive a paging message on a physical downlink channel (e.g., PDCCH, PDSCH) based at least in part on the tracking loop.

The UE 120 may receive the LTE CRS in the SSB beam and thus may use a TCI state of the SSB beam. The LTE CRS may be QCLed with the SSB, which may be QCLed with the TRS. The LTE CRS may experience similar channel properties as the SSB and the TRS. Furthermore, the SSB and the TRS may share similar channel properties as the PDSCH or the PDCCH. For decoding, the PDSCH may be QCLed with the PTRS, as shown by FIG. 6. The PDCCH may also be QCLed with the PTRS.

As shown by reference number 935, the UE 120 may go back to sleep. That is, the UE 120 may update the tracking loop with an LTE CRS before a next SSB or TRS is transmitted, as shown by reference number 940. That is, the UE 120 may wake up and use an available LTE CRS and sleep through a future SSB or TRS. As a result, the UE 120 may update its tracking loop while saving power.

In some aspects, the UE 120 may use an LTE CRS measurement for fast SCell activation. For example, the UE 120 may normally use an aperiodic TRS in a deactivated SCell to help the UE 120 to update its tracking loops so that the UE 120 can immediately activate an SCell without first receiving and processing the next SSB. However, if the SCell is in a DSS band, the LTE CRS can be used instead of the aperiodic TRS for the fast SCell activation.

LTE CRS-based fast SCell activation may include the UE 120 receiving an SCell activation command and receiving the LTE CRS for a tracking loop update. In the legacy procedure, the UE 120 would receive an SSB for the tracking loop update, which could introduce additional latency of 20 ms. The UE 120 may receive an aperiodic TRS from the NR network after the SCell activation command. By measuring the always-on LTE CRS, the UE 120 may achieve fast SCell activation, even when the NR network does not transmit the aperiodic TRS. The NR network and the UE 120 may then activate the SCell.

As indicated above, FIG. 9 is provided as an example. Other examples may differ from what is described with regard to FIG. 9.

Figure 10:
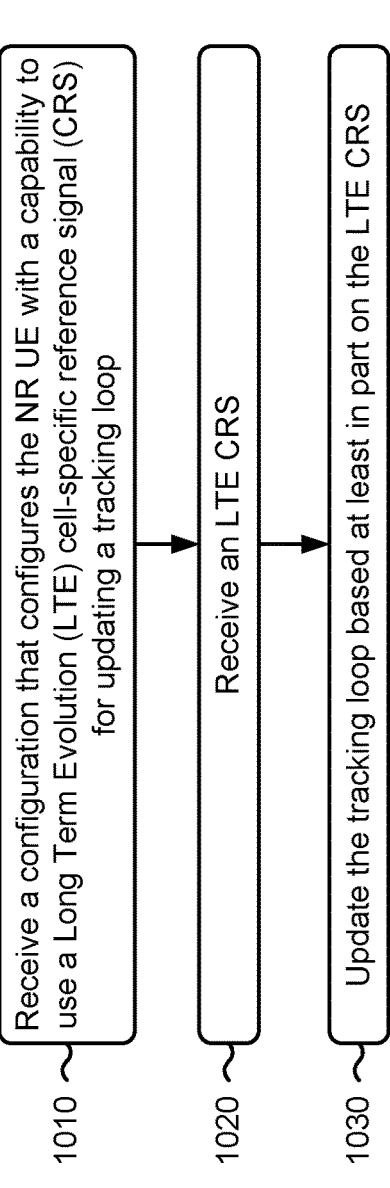
FIG. 10 is a diagram illustrating an example process performed, for example, by a UE, in accordance with the present disclosure.

FIG. 10 is a diagram illustrating an example process 1000 performed, for example, by an NR UE, in accordance with the present disclosure. Example process 1000 is an example where the NR UE (e.g., UE 120) performs operations associated with using LTE CRSs for tracking loop updates.

As shown in FIG. 10, in some aspects, process 1000 may include receiving a configuration that configures the NR UE with a capability to use an LTE CRS for updating a tracking loop (block 1010). For example, the NR UE (e.g., using communication manager 140 and/or reception component 1202 depicted in FIG. 12) may receive a configuration that configures the NR UE with a capability to use an LTE CRS for updating a tracking loop, as described above.

As further shown in FIG. 10, in some aspects, process 1000 may include receiving an LTE CRS (block 1020). For example, the NR UE (e.g., using communication manager 140 and/or reception component 1202 depicted in FIG. 12) may receive an LTE CRS, as described above.

As further shown in FIG. 10, in some aspects, process 1000 may include updating the tracking loop based at least in part on the LTE CRS (block 1030). For example, the NR UE (e.g., using communication manager 140 and/or tracking component 1208 depicted in FIG. 12) may update the tracking loop based at least in part on the LTE CRS, as described above.

Process 1000 may include additional aspects, such as any single aspect or any combination of aspects described below and/or in connection with one or more other processes described elsewhere herein.

In a first aspect, the indication includes a TCI state configuration or QCL information between an NR reference signal and the LTE CRS.

In a second aspect, alone or in combination with the first aspect, the NR UE is in an inactive state or an idle state, and process 1000 includes waking up to receive the LTE CRS.

In a third aspect, alone or in combination with one or more of the first and second aspects, process 1000 includes receiving a paging message on a physical downlink channel based at least in part on the tracking loop.

In a fourth aspect, alone or in combination with one or more of the first through third aspects, the LTE CRS is QCLed with an NR SSB or an NR TRS on a DSS carrier.

In a fifth aspect, alone or in combination with one or more of the first through fourth aspects, the LTE CRS is Type C QCLed with the NR SSB or the NR TRS.

In a sixth aspect, alone or in combination with one or more of the first through fifth aspects, the LTE CRS is Type D QCLed with the NR SSB or the NR TRS.

In a seventh aspect, alone or in combination with one or more of the first through sixth aspects, the LTE CRS is QCLed with a subset of SSBs for each CSI-RS.

In an eighth aspect, alone or in combination with one or more of the first through seventh aspects, process 1000 includes receiving an indication of a pattern of the LTE CRS.

In a ninth aspect, alone or in combination with one or more of the first through eighth aspects, the pattern of the LTE CRS is associated with a subset of CRSs that are received from a base station and that are quasi-co-located with an NR SSB or an NR TRS.

In a tenth aspect, alone or in combination with one or more of the first through ninth aspects, a configuration of the LTE CRS is part of a PTRS configuration.

In an eleventh aspect, alone or in combination with one or more of the first through tenth aspects, the PTRS configuration includes a transmit power offset between the LTE CRS and an SSS or a paging physical downlink channel.

In a twelfth aspect, alone or in combination with one or more of the first through eleventh aspects, the PTRS configuration includes a resource ID of the LTE CRS.

In a thirteenth aspect, alone or in combination with one or more of the first through twelfth aspects, process 1000 includes receiving an indication of a transmit power offset between the LTE CRS and an SSS or a paging physical downlink channel.

In a fourteenth aspect, alone or in combination with one or more of the first through thirteenth aspects, process 1000 includes receiving an indication of a resource ID of the LTE CRS.

In a fifteenth aspect, alone or in combination with one or more of the first through fourteenth aspects, updating the tracking loop includes measuring the LTE CRS to update the tracking loop in an MBSFN subframe.

In a sixteenth aspect, alone or in combination with one or more of the first through fifteenth aspects, process 1000 includes receiving an SCell activation command, and activating an SCell based at least in part on a measurement of the LTE CRS.

In a seventeenth aspect, alone or in combination with one or more of the first through sixteenth aspects, activating the SCell includes activating the SCell before a next SSB is received.

In an eighteenth aspect, alone or in combination with one or more of the first through seventeenth aspects, updating the tracking loop includes updating the tracking loop further based at least in part on a received NR TRS.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
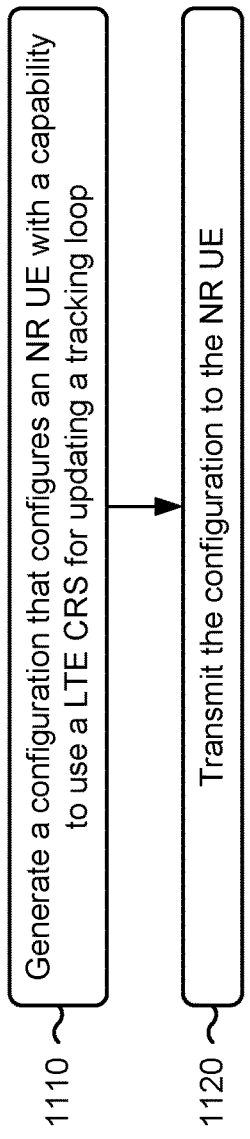
FIG. 11 is a diagram illustrating an example process performed, for example, by a base station, in accordance with the present disclosure.

FIG. 11 is a diagram illustrating an example process 1100 performed, for example, by a base station, in accordance with the present disclosure. Example process 1100 is an example where the base station (e.g., base station 110) performs operations associated with indicating that LTE CRSs are to be used for tracking loop updates.

As shown in FIG. 11, in some aspects, process 1100 may include generating a configuration that configures an NR UE with a capability to use an LTE CRS for updating a tracking loop (block 1110). For example, the base station (e.g., using communication manager 150 and/or generation component 1308 depicted in FIG. 13) may generate a configuration that configures an NR UE with a capability to use an LTE CRS for updating a tracking loop, as described above.

As further shown in FIG. 11, in some aspects, process 1100 may include transmitting the configuration to the NR UE (block 1120). For example, the base station (e.g., using communication manager 150 and/or transmission component 1304 depicted in FIG. 13) may transmit the configuration to the NR UE, as described above.

Process 1100 may include additional aspects, such as any single aspect or any combination of aspects described below and/or in connection with one or more other processes described elsewhere herein.

In a first aspect, process 1100 includes transmitting the LTE CRS to the NR UE.

In a second aspect, alone or in combination with the first aspect, the configuration includes a TCI state configuration or QCL information between an NR reference signal and the LTE CRS.

In a third aspect, alone or in combination with one or more of the first and second aspects, process 1100 includes transmitting a paging message on a physical downlink channel in association with the LTE CRS.

In a fourth aspect, alone or in combination with one or more of the first through third aspects, the LTE CRS is QCLed with an NR SSB or an NR TRS on a DSS carrier.

In a fifth aspect, alone or in combination with one or more of the first through fourth aspects, process 1100 includes transmitting an indication of a pattern of the LTE CRS.

In a sixth aspect, alone or in combination with one or more of the first through fifth aspects, a configuration of the LTE CRS is part of a PTRS configuration.

In a seventh aspect, alone or in combination with one or more of the first through sixth aspects, process 1100 includes transmitting an indication of a transmit power offset between the LTE CRS and an SSS or a paging physical downlink channel.

In an eighth aspect, alone or in combination with one or more of the first through seventh aspects, process 1100 includes transmitting a SCell activation command.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
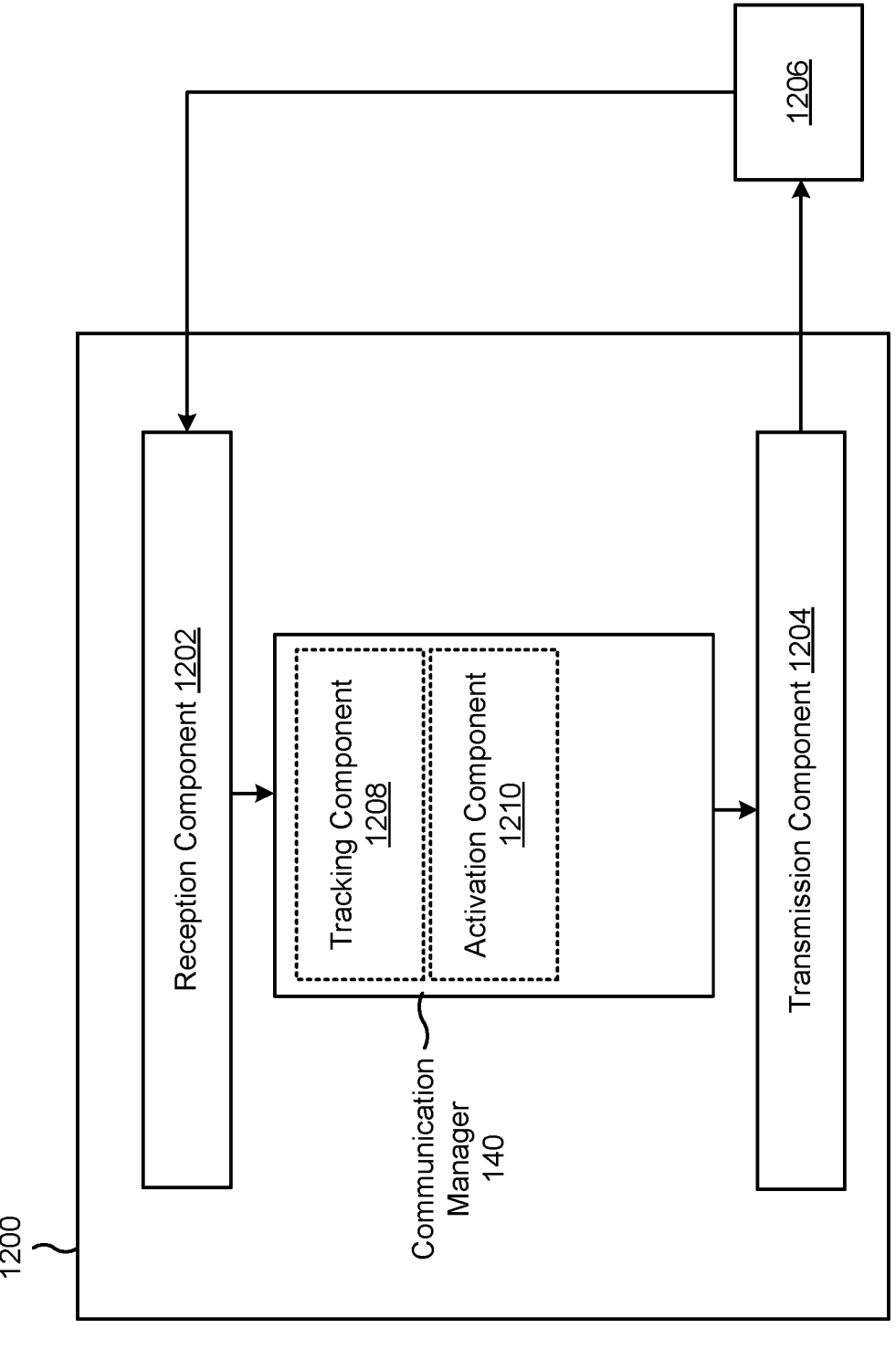
FIGS. 12-13 are diagrams of example apparatuses for wireless communication, in accordance with the present disclosure.

FIG. 12 is a diagram of an example apparatus 1200 for wireless communication. The apparatus 1200 may be an NR UE (e.g., a UE 120), or an NR UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include a tracking component 1208 and/or a activation component 1210, among other examples.

In some aspects, the apparatus 1200 may be configured to perform one or more operations described herein in connection with FIGS. 1-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive a configuration that configures the NR UE with a capability to use an LTE CRS for updating a tracking loop. The reception component 1202 may receive an LTE CRS. The tracking component 1208 may update the tracking loop based at least in part on the LTE CRS.

The reception component 1202 may receive a paging message on a physical downlink channel based at least in part on the tracking loop. The reception component 1202 may receive an indication of a pattern of the LTE CRS and/or an indication of a transmit power offset between the LTE CRS and an SSS or a paging physical downlink channel. The reception component 1202 may receive an indication of a resource ID of the LTE CRS.

The reception component 1202 may receive an SCell activation command. The activation component 1210 may activate an SCell based at least in part on a measurement of the LTE CRS.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
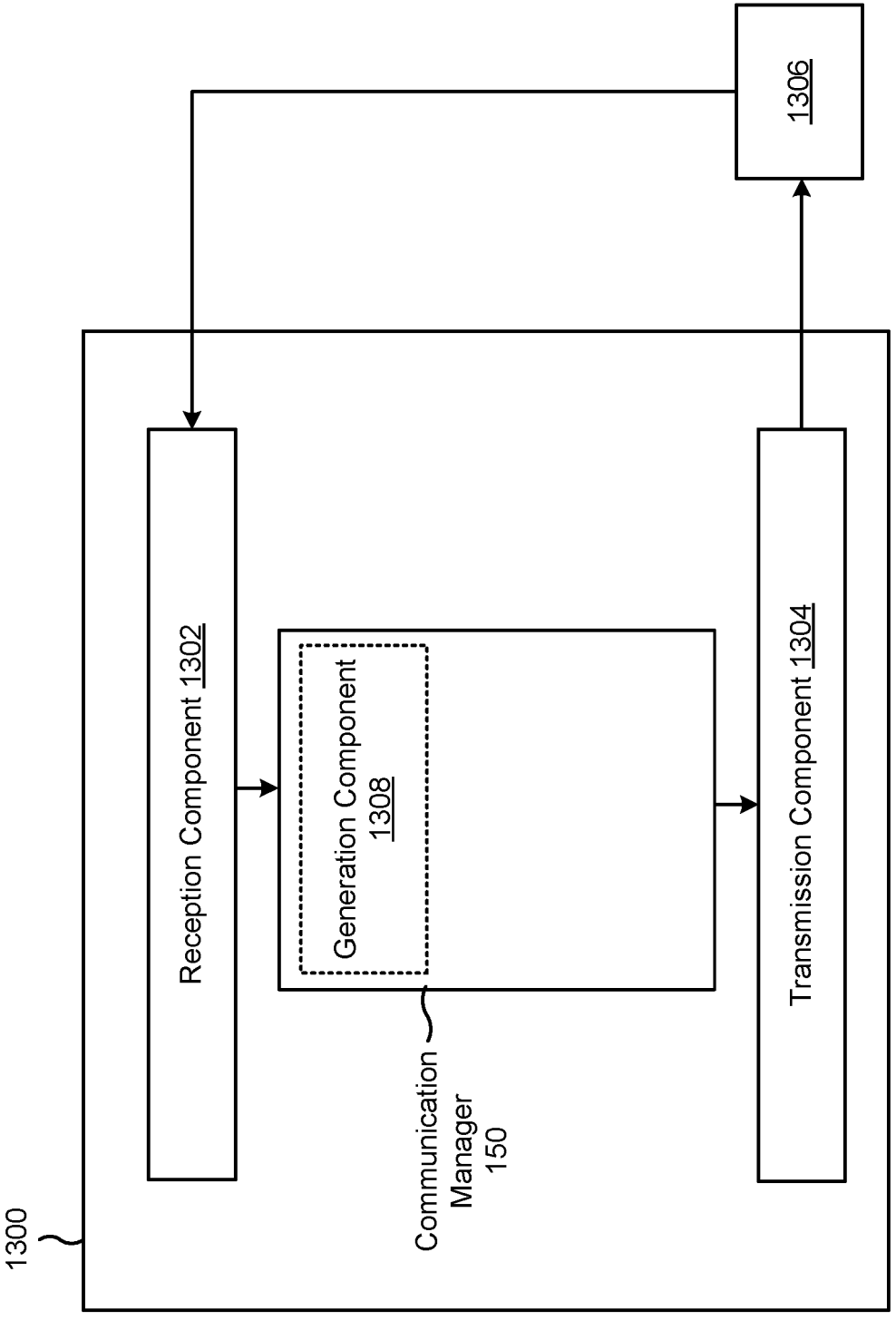

FIG. 13 is a diagram of an example apparatus 1300 for wireless communication. The apparatus 1300 may be a base station (e.g., base station 110), or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a generation component 1308, among other examples.

In some aspects, the apparatus 1300 may be configured to perform one or more operations described herein in connection with FIGS. 1-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The generation component 1308 may generate a configuration that configures an NR UE with a capability to use an LTE CRS for updating a tracking loop. The transmission component 1304 may transmit the configuration to the NR UE. The transmission component 1304 may transmit the LTE CRS to the NR UE.

The transmission component 1304 may transmit a paging message on a physical downlink channel in association with the LTE CRS. The transmission component 1304 may transmit an indication of a pattern of the LTE CRS. The transmission component 1304 may transmit an indication of a transmit power offset between the LTE CRS and an SSS or a paging physical downlink channel. The transmission component 1304 may transmit an SCell activation command.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a New Radio (NR) user equipment (UE) configured to operate in an NR network, comprising: receiving a configuration that configures the NR UE with a capability to use a Long Term Evolution (LTE) cell-specific reference signal (CRS) for updating a tracking loop; receiving an LTE CRS; and updating the tracking loop based at least in part on the LTE CRS.

Aspect 2: The method of Aspect 1, wherein the configuration includes a transmission configuration indicator state configuration or quasi-co-location information between an NR reference signal and the LTE CRS.

Aspect 3: The method of Aspect 1 or 2, wherein the NR UE is in an inactive state or an idle state, and wherein the method further comprises waking up to receive the LTE CRS.

Aspect 4: The method of any of Aspects 1-3, further comprising receiving a paging message on a physical downlink channel based at least in part on the tracking loop.

Aspect 5: The method of any of Aspects 1-4, wherein the LTE CRS is quasi-co-located (QCLed) with an NR synchronization signal block (SSB) or an NR tracking reference signal (TRS) on a dynamic spectrum sharing (DSS) carrier.

Aspect 6: The method of Aspect 5, wherein the LTE CRS is Type C QCLed with the NR SSB or the NR TRS.

Aspect 7: The method of Aspect 5, wherein the LTE CRS is Type D QCLed with the NR SSB or the NR TRS.

Aspect 8: The method of Aspect 5, wherein the LTE CRS is QCLed with a subset of SSBs for each channel state information reference signal.

Aspect 9: The method of any of Aspects 1-8, further comprising receiving an indication of a pattern of the LTE CRS.

Aspect 10: The method of Aspect 9, wherein the pattern of the LTE CRS is associated with a subset of CRSs that are received from a base station and that are quasi-co-located with an NR synchronization signal block or an NR tracking reference signal.

Aspect 11: The method of any of Aspects 1-10, wherein a configuration of the LTE CRS is part of a phase tracking refence signal (PTRS) configuration.

Aspect 12: The method of Aspect 11, wherein the PTRS configuration includes a transmit power offset between the LTE CRS and a secondary synchronization signal or a paging physical downlink channel.

Aspect 13: The method of Aspect 11 or 12, wherein the PTRS configuration includes a resource identifier of the LTE CRS.

Aspect 14: The method of any of Aspects 1-13, further comprising receiving an indication of a transmit power offset between the LTE CRS and a secondary synchronization signal or a paging physical downlink channel.

Aspect 15: The method of any of Aspects 1-14, further comprising receiving an indication of a resource identifier of the LTE CRS.

Aspect 16: The method of any of Aspects 1-15, wherein updating the tracking loop includes measuring the LTE CRS to update the tracking loop in a multicast-broadcast single-frequency network subframe.

Aspect 17: The method of any of Aspects 1-16, further comprising: receiving a secondary cell (SCell) activation command; and activating an SCell based at least in part on a measurement of the LTE CRS.

Aspect 18: The method of Aspect 17, wherein activating the SCell includes activating the SCell before a next synchronization signal block is received.

Aspect 19: The method of any of Aspects 1-18, wherein updating the tracking loop includes updating the tracking loop further based at least in part on a received New Radio tracking reference signal.

Aspect 20: A method of wireless communication performed by a base station, comprising: generating a configuration that configures a New Radio (NR) user equipment (UE), configured to operate in an NR network, with a capability to use a Long Term Evolution (LTE) cell-specific reference signal (CRS) for updating a tracking loop; and transmitting the configuration to the NR UE.

Aspect 21: The method of Aspect 20, further comprising transmitting the LTE CRS to the NR UE.

Aspect 22: The method of Aspect 20 or 21, wherein the configuration includes a transmission configuration indicator state configuration or quasi-co-location information between an NR reference signal and the LTE CRS.

Aspect 23: The method of any of Aspects 20-22, further comprising transmitting a paging message on a physical downlink channel in association with the LTE CRS.

Aspect 24: The method of any of Aspects 20-23, wherein the LTE CRS is quasi-co-located (QCLed) with an NR synchronization signal block (SSB) or an NR tracking reference signal (TRS) on a dynamic spectrum sharing (DSS) carrier.

Aspect 25: The method of any of Aspects 20-24, further comprising transmitting an indication of a pattern of the LTE CRS.

Aspect 26: The method of any of Aspects 20-25, wherein a configuration of the LTE CRS is part of a phase tracking refence signal (PTRS) configuration.

Aspect 27: The method of any of Aspects 20-26, further comprising transmitting an indication of a transmit power offset between the LTE CRS and a secondary synchronization signal or a paging physical downlink channel.

Aspect 28: The method of any of Aspects 20-27, further comprising transmitting a secondary cell (SCell) activation command.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE), comprising:
one or more memories; and
one or more processors, coupled to the one or more memories, configured to:
    receive, from a network node in a single radio resource control (RRC) message, a configuration, for using a particular broadcast signal, associated with:
        a pattern of first broadcast signals including first broadcast signals that includes the particular broadcast signal,
        a resource identification of a first broadcast signal of the first broadcasting signals, and
        a transmit power offset associated with the first broadcast signal, of the first broadcast signals, and a second broadcast signal, different from the first broadcast signals; and
    receive, from the network node and based on the configuration, the particular broadcast signal.

2. The UE of claim 1, wherein the first broadcast signals are synchronization signal blocks (SSBs).

3. The UE of claim 1, wherein the configuration is received via dedicated radio resource control (RRC) signaling.

4. The UE of claim 1, wherein the configuration is received via a system information block (SIB).

5. The UE of claim 1, wherein the configuration is for using the particular broadcast signal for updating a tracking loop prior to receiving the particular broadcast signal.

6. The UE of claim 5, wherein the one or more processors are configured to:
update the tracking loop prior to receiving the particular broadcast signal.

7. The UE of claim 5, wherein the one or more processors are configured to:
generate the configuration.

8. The UE of claim 1, wherein the one or more processors are configured to:
receive a paging to wake up to receive the particular broadcast signal.

9. A method of wireless communication performed by a user equipment (UE), comprising:
receiving, from a network node in a single radio resource control (RRC) message, a configuration, for using a particular broadcast signal, associated with:
    a pattern of first broadcast signals including first broadcasting signals that includes the particular broadcast signal,
    a resource identifier of a first broadcast signal of the first broadcasting signals, and
    a transmit power offset associated with the first broadcast signal, of the first broadcast signals, and a second broadcast signal, different from the first broadcast signals, and
receiving, from the network node and based on the configuration, the particular broadcast signal.

10. The method of claim 9, wherein the first broadcast signals are synchronization signal blocks (SSBs).

11. The method of claim 9, wherein the configuration is received via dedicated radio resource control (RRC) signaling.

12. The method of claim 9, wherein the configuration is received via a system information block (SIB).

13. The method of claim 9, wherein the configuration is for using the particular broadcast signal for updating a tracking loop prior to receiving the particular broadcast signal.

14. The method of claim 13, further comprising:

updating the tracking loop prior to receiving the particular broadcast signal.

15. The method of claim 9, further comprising:

receiving a paging to wake up to receive the particular broadcast signal.

16. A network node, comprising:

one or more memories; and one or more processors, coupled to the one or more memories, configured to:

transmit, to a user equipment (UE) in a single radio resource control (RRC) message, a configuration, for using a particular broadcast signal, associated with:

a pattern of first broadcast signals including first broadcasting signals that includes the particular broadcast signal, a resource identifier of a first broadcast signal of the first broadcasting signals, and a transmit power offset associated with the first broadcast signal, of the first broadcast signals, and a second broadcast signal, different from the first broadcast signals, and transmit, to the UE and based on the configuration, the particular broadcast signal.

17. The network node of claim 16, wherein the first broadcast signals are synchronization signal blocks (SSBs).

18. The network node of claim 16, wherein the configuration is transmitted via dedicated radio resource control (RRC) signaling or a system information block SIB.

19. The network node of claim 16, wherein the configuration is for using the particular broadcast signal for updating a tracking loop prior to receiving the particular broadcast signal.

20. The network node of claim 16, wherein the one or more processors are configured to:

transmit a paging to the UE to wake up to receive the particular broadcast signal.

* * * * *